A. COVELLO.
AEROPLANE.
APPLICATION FILED MAY 18, 1920.
1,355,315.
Patented Oct. 12, 1920.
2 SHEETS—SHEET 2.
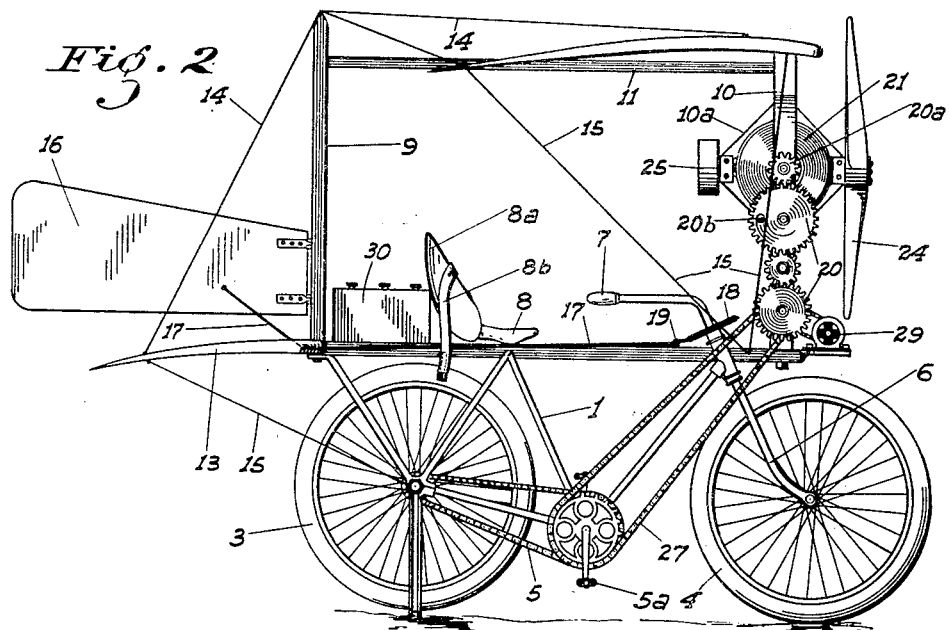
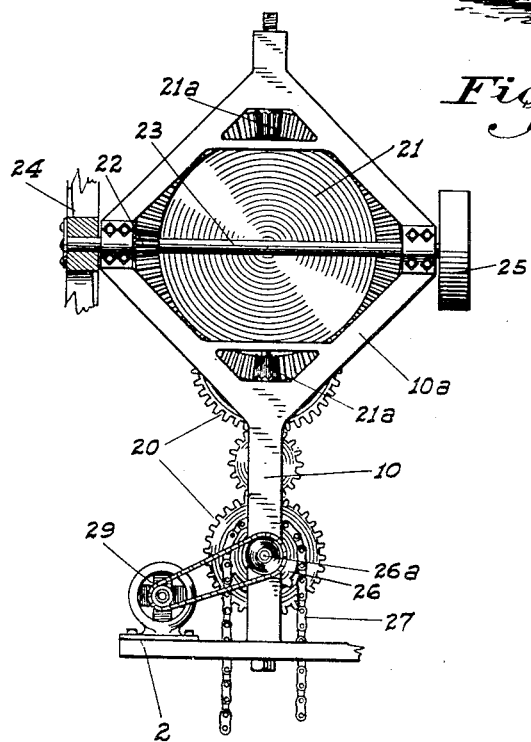
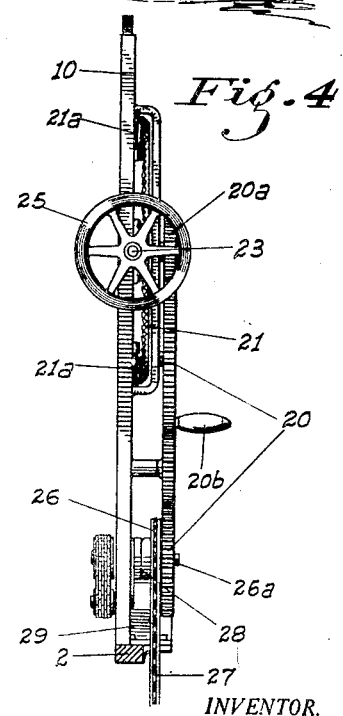
INVENTOR.
Albert Covello.
BY
ATTORNEY

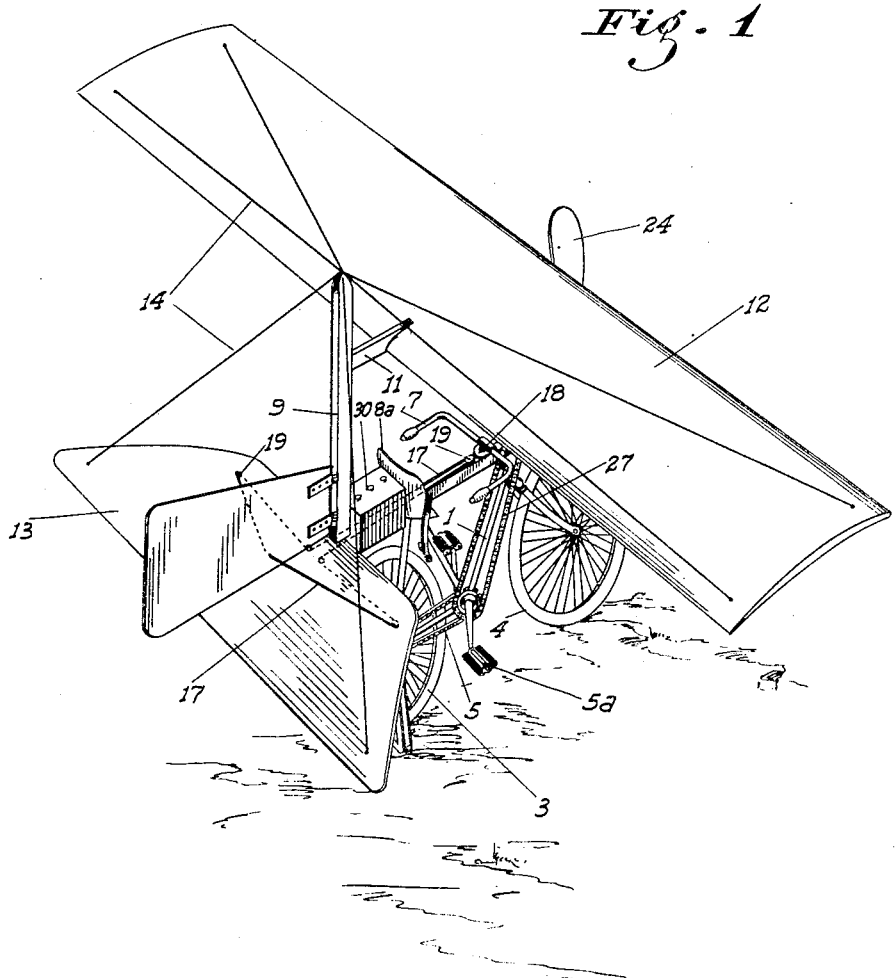

UNITED STATES PATENT OFFICE.

ALBERT COVELLO, OF ANGELS CAMP, CALIFORNIA.

AEROPLANE.

1,355,315.  Specification of Letters Patent.  Patented Oct. 12, 1920.

Application filed May 18, 1920. Serial No. 382,248.

*To all whom it may concern:*

Be it known that I, ALBERT COVELLO, a citizen of the United States, residing at Angels Camp, in the county of Calaveras, State of California, have invented certain new and useful Improvements in Aeroplanes; and I do declare the following to be a full, clear, and exact description of the same, reference being had to the accompanying drawings and to the characters of reference marked thereon, which form a part of this application.

This invention relates to improvements in aeroplanes, the principal object being to devise and construct a heavier-than-air machine in such a manner that it will be light enough to be operated manually by a single person, either by means of the feet or the hands, or both.

Another object is to combine the properties of a bicycle with those of an aeroplane, so that a person using the device may either travel on the ground, or by speeding up, will rise into the air and travel forward at the same time.

A third object is to arrange and connect the parts of the machine so that very little area will be presented to impede easy movement of the device through the air, and yet having ample supporting surface to sustain the weight when off the ground.

A further object of the invention is to produce a simple and inexpensive device, and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 1 is a perspective plan view of the aeroplane.

Fig. 2 is a side elevation thereof.

Fig. 3 is an enlarged fragmentary elevation of the driving gears.

Fig. 4 is an end elevation of the same.

Referring now more particularly to the characters of reference on the drawings, the numeral 1 denotes a truss-like framework, similar to that of an ordinary bicycle, but having a relatively long and heavy horizontal beam 2 forming the top of such framework.

In the frame 1 are turnably mounted a pair of longitudinally spaced wheels 3 and 4, the rear wheel 3 being connected to be driven with a chain drive 5 by pedals $5^a$, bicycle fashion, and the front wheel 4 being mounted in a swivel-fork 6 controlled by the ordinary handle bars 7 above the beam 2.

A seat 8 on the beam 2 receives the rider, having a back $8^a$ and a belt $8^b$ to strap around the rider.

It will be apparent that thus far, with the exception of the beam 2, I have not departed from ordinary bicycle construction.

Projecting upwardly from the beam 2 at the rear end thereof is a standard 9, being rigidly fixed to said beam, while from the forward end of the beam, ahead of the handle bars, a frame 10 also projects upwardly therefrom and is secured thereto. The upper ends of these standards are rigidly tied together by a longitudinal bar 11 extending therebetween.

Fixed to the bar 11 is a transverse wing or plane 12, extending an equal distance on each side of the bar.

Fixed to the lower beam 2 and projecting to the rear of the standard 9 is a tail-shaped wing 13, of considerably less area than the wing 12.

Said standard 9 projects above the bar 11, a certain distance, and from the upper end thereof guy wires 14 extend to the upper corners of both wings. Similar wires 15 extend from the under corners to suitable points on the frame 1—2, and so as not to interfere with any necessary freedom of movement of the aviator.

A vertical and longitudinal rudder 16 is hinged to the support 9, above the rear wing 13. This rudder is controlled by means of crossed cables 17 passing around a sheave 18 fixed on the upper end of the front wheel fork.

Pulleys 19 are placed at suitable intervals to guide the cables where necessary.

On the right hand side of the forward frame 10, which has arms $10^a$ extending longitudinally of the machine, is mounted a train of gears 20 one of which has a handle $20^b$ whereby it may be turned by hand.

The uppermost pinion $20^a$ of this train is connected to a large bevel gear 21 which meshes with the bevel pinion 22 fixed on a longitudinal shaft 23 journaled in the frame 10, on the forward end of which shaft is a propeller 24 and on the rear end thereof a fly or balance wheel 25, to give steadiness of movement.

Idler pinions 21ᵃ mounted in the frame and with which the gear 21 meshes serve to guide the latter and prevent it from wearing its bearings out of round, since this structure is made as light and narrow as possible to reduce the resistance area, and hence said bearings are not as long as they would otherwise be made.

Turnable with one of the gears 20 and positioned between the same and the support is a sprocket wheel 26 from which a chain 27 extends downwardly with suitable coöperating members to be driven by the pedals 5ᵃ in conjunction with the driving of the rear wheel 3.

Therefore with the turning of said pedals, both the wheel 3 and the propeller 24 will be driven, and if desired, one hand of the aviator may be used to turn the gear-handle 20ᵇ to relieve the feet of some of the work.

In order to permit the movement of the pedals to be stopped entirely to rest the feet and legs, and still have the propeller turning, the sprocket wheel 26 is provided with a coaster-brake 28, such as are installed on bicycles. This permits the said sprocket, and hence the pedals, to be held inactive while allowing the gear 20 to be turned by hand.

I may also provide a small electric motor 29 connected to turn the sprocket-wheel shaft 26ᵃ, said motor deriving its power from a storage battery 30 mounted on the frame 1—2 in any suitable location.

This motor is also operatively connected with the aforementioned coaster-brake, so that it may remain inactive when it is not desired to utilize the same.

In operation, if the pedals are turned slowly, an easy movement along the ground will be had, since the lifting effort of the wings at low speed is not sufficient to overcome the weight supported thereby. If the speed of the wheels and propeller is increased, however, the machine will gradually leave the ground, and will fly, and will so contiue as long as that rate of speed is maintained. When it is desired to return to the ground, the speed is gradually slackened, and the machine accordingly descends. Such a method of control has eliminated the need of ailerons such as are usually provided.

It is not intended with this device to make high flights, but rather to clear fences, trees, and the like so as to be able to fly across fields, creeks, etc., where otherwise travel would be slow or impossible.

From the foregoing description it will be readily seen that I have produced such a device as substantially fulfils the object of the invention as set forth herein.

While this specification sets forth in detail the present and preferred construction of the device still in practice such deviations from such detail may be resorted to as do not form a departure from the spirit of the invention, as defined by the appended claims.

Having thus described my invention what I claim as new and useful and desire to secure by Letters Patent is:—

1. An aeroplane comprising a bicycle structure, a vertical and narrow rectangular framework, projecting upwardly from said structure, fore and aft wings centrally fixed to the framework, a rudder hinged to the rear vertical bar of said framework, and a propeller mounted to the forward vertical bar thereof, the aviator occupying a position on the bicycle structure intermediate the vertical bars.

2. An aeroplane comprising a bicycle structure, a vertical and narrow rectangular framework projecting upwardly from said structure, fore and aft wings centrally fixed to the framework, a rudder hinged to the rear vertical bar of said framework, and a propeller mounted to the forward vertical bar thereof, the aviator occupying a position on the bicycle structure intermediate the vertical bars, there being means manually operated by the aviator for driving the rear wheel of the bicycle structure and the propeller simultaneously.

In testimony whereof I affix my signature.

ALBERT COVELLO.